US008640633B2

(12) United States Patent
Raley et al.

(10) Patent No.: US 8,640,633 B2
(45) Date of Patent: Feb. 4, 2014

(54) BIOMASS FUEL FURNACE SYSTEM AND RELATED METHODS

(75) Inventors: Jimmie C. Raley, Yellville, AR (US); Jeremy S. Lord, Fort Wayne, IN (US); Timothy A. Mann, Fort Wayne, IN (US); Gerald D. Stimson, Fort Wayne, IN (US); Anthony B. Tranquill, Huntertown, IN (US); Charles E. Wood, Roanoke, IN (US); Donald W. Cox, Fort Wayne, IN (US)

(73) Assignee: Wayne/Scott Fetzer Company, Fort Wayne, IN (US)

( * ) Notice: Subject to any disclaimer, the term of this patent is extended or adjusted under 35 U.S.C. 154(b) by 1209 days.

(21) Appl. No.: 12/541,628

(22) Filed: Aug. 14, 2009

(65) Prior Publication Data
US 2010/0058960 A1 Mar. 11, 2010

Related U.S. Application Data

(60) Provisional application No. 61/089,267, filed on Aug. 15, 2008.

(51) Int. Cl.
*F23G 5/033* (2006.01)
*F23K 3/18* (2006.01)

(52) U.S. Cl.
USPC ........... 110/222; 110/108; 110/115; 110/118; 110/101 CD; 110/186; 110/258; 110/101 CF; 110/110

(58) Field of Classification Search
USPC ......... 110/222, 225, 227, 258, 295, 346, 106, 110/108, 115, 101 R, 118, 101 CD, 186, 110/110, 101 C, 101 CF, 101 CB, 101 CC; 432/14; 122/449
See application file for complete search history.

(56) References Cited

U.S. PATENT DOCUMENTS 2,138,120 A * 11/1938 Raisch ........................... 110/225
3,737,285 A * 6/1973 Hicks ............................. 422/111
(Continued)

FOREIGN PATENT DOCUMENTS

| CA | 2 358 404 A1 | 3/2003 |
| FR | 2 907 881 A | 5/2008 |
| GB | 1 451 016 A | 9/1976 |

OTHER PUBLICATIONS

European Patent Office; Search Report and Written Opinion in International Patent Application No. PCT/US2009/053880 dated Mar. 4, 2010, 15 pages.

*Primary Examiner* — Kenneth Rinehart
*Assistant Examiner* — David J Laux
(74) *Attorney, Agent, or Firm* — Wood, Herron & Evans, LLP (57) ABSTRACT

A furnace system for heating a poultry brooder house includes a firebox for burning biomass fuel, and a grate within the firebox for burning the biomass fuel thereon. A distributor assembly may positioned within the firebox and is located directly above the grate. The distributor assembly includes a distributor plate having a plurality of apertures therethrough, and a distributor arm above the distributor plate that is movable relative to the distributor plate to cause biomass fuel supported on the plate to pass through the apertures and fall onto the grate. The furnace system may include a hopper assembly that defines a well for receiving a volume of biomass fuel for delivery to the grate or to the distributor plate.

26 Claims, 9 Drawing Sheets

(56) References Cited

U.S. PATENT DOCUMENTS

| | | | | |
|---|---|---|---|---|
| 3,772,998 A | * | 11/1973 | Menigat | 110/222 |
| 3,874,433 A | | 4/1975 | Shepherd, Jr. et al. | |
| 4,203,374 A | | 5/1980 | Frederick | |
| 4,208,279 A | | 6/1980 | Varani | |
| 4,231,304 A | | 11/1980 | Hoskinson | |
| 4,528,917 A | * | 7/1985 | Jacobs | 110/300 |
| 4,732,092 A | | 3/1988 | Gould | |
| 4,836,115 A | | 6/1989 | MacArthur | |
| 4,936,231 A | * | 6/1990 | Johnson | 110/235 |
| 5,086,714 A | | 2/1992 | Hladun | |
| 5,123,360 A | | 6/1992 | Burke et al. | |
| 5,159,884 A | | 11/1992 | Malick | |
| 5,261,335 A | | 11/1993 | Blevins, Jr. | |
| 5,329,867 A | | 7/1994 | Sugita | |
| 5,347,936 A | | 9/1994 | Thorhuus | |
| 5,398,623 A | | 3/1995 | Lautenschlager et al. | |
| 5,505,144 A | | 4/1996 | Doron et al. | |
| 5,522,327 A | | 6/1996 | Buckner et al. | |
| 5,651,321 A | | 7/1997 | Siniakevith et al. | |
| 5,720,232 A | | 2/1998 | Meador | |
| 5,799,590 A | | 9/1998 | Noguchi | |
| 5,836,258 A | | 11/1998 | Ruegg et al. | |
| 5,893,358 A | | 4/1999 | Whitfield | |
| 5,927,215 A | | 7/1999 | Moriguchi | |
| 6,048,374 A | | 4/2000 | Green | |
| 6,067,979 A | | 5/2000 | Jaasma et al. | |
| 6,189,463 B1 | | 2/2001 | Ling et al. | |
| 6,237,511 B1 | | 5/2001 | Honkasalo | |
| 6,244,196 B1 | | 6/2001 | Kimberlin | |
| 6,273,009 B1 | | 8/2001 | Magnusson | |
| 6,336,449 B1 | | 1/2002 | Drisdelle et al. | |
| 6,401,636 B2 | * | 6/2002 | Brunnmair et al. | 110/346 |
| 6,405,662 B1 | | 6/2002 | Williams et al. | |
| 6,619,214 B2 | | 9/2003 | Walker | |
| 6,752,093 B2 | | 6/2004 | Schirmer et al. | |
| 6,786,335 B1 | | 9/2004 | Gropper et al. | |
| 6,860,236 B2 | | 3/2005 | Wood | |
| 6,883,442 B1 | | 4/2005 | Groszek et al. | |
| 6,937,764 B2 | | 8/2005 | Sakamoto et al. | |
| 6,948,436 B2 | | 9/2005 | Mooney et al. | |
| 7,013,816 B2 | | 3/2006 | Herlt | |
| 7,028,624 B2 | | 4/2006 | Tsinman et al. | |
| 7,263,934 B2 | | 9/2007 | Copeland et al. | |
| 7,293,511 B2 | | 11/2007 | Prigmore et al. | |
| 7,341,024 B2 | | 3/2008 | Wood | |
| 7,392,753 B2 | | 7/2008 | Kume | |
| 7,426,891 B2 | | 9/2008 | Loving | |
| 2002/0144981 A1 | * | 10/2002 | Mitchell | 219/121.44 |
| 2004/0011298 A1 | | 1/2004 | Wood | |
| 2004/0168651 A1 | | 9/2004 | Wood | |
| 2004/0200428 A1 | | 10/2004 | Wood | |
| 2005/0161375 A1 | | 7/2005 | Gnedenko et al. | |
| 2006/0144303 A1 | | 7/2006 | Loving | |
| 2006/0196400 A1 | | 9/2006 | Martin et al. | |
| 2006/0236906 A1 | * | 10/2006 | Buhr et al. | 110/262 |
| 2007/0137538 A1 | | 6/2007 | Sterr | |
| 2007/0215021 A1 | | 9/2007 | Krumrei | |
| 2007/0251436 A1 | | 11/2007 | Beausoleil et al. | |
| 2007/0289507 A1 | | 12/2007 | Parrott et al. | |
| 2008/0035036 A1 | | 2/2008 | Bassani et al. | |
| 2008/0072806 A1 | | 3/2008 | Kimberlin et al. | |

* cited by examiner

BIOMASS FUEL FURNACE SYSTEM AND RELATED METHODS

CROSS-REFERENCE TO RELATED APPLICATIONS

This application claims priority to U.S. Provisional Patent Application Ser. No. 61/089,267 filed on Aug. 15, 2008, the disclosure of which is incorporated by reference herein in its entirety.

TECHNICAL FIELD

This invention relates generally to the conversion of energy, and more particularly, to the conversion of biomass fuel from livestock into useful heat.

BACKGROUND

Commercial livestock operations, such as poultry operations, are known and may include, for example, relatively large buildings that house foul, such as turkeys and chickens, until these reach a desired weight. In these operations, the buildings must be heated to maintain the temperature within a desirable range, and the litter (or droppings) produced by the birds must be removed from the buildings. In conventional commercial poultry operations, heaters are used to provide heat to the buildings housing the birds, with known heaters being fueled by propane or natural gas, for example. The cost to operate these types of heaters, however, is increasingly more expensive due to high fuel costs. Since the profitability of a poultry operation is directly related to the costs associated with the buildings' operating costs, the profitability of the poultry operation decreases with rising heating costs unless the revenue received by the poultry operator (e.g., farmer) also increases. This may translate into higher prices for the consumer.

Removal of litter (or droppings) from the large buildings housing the birds may include placing clean litter on the floor of a poultry house before the birds are delivered. Known litter materials include organic materials such as sawdust, wood chips, and rice hull; inorganic materials such as sand; and processed materials such as shredded newspaper, for example. In operations of this type, the birds leave their droppings on the litter, which in turn absorbs most of the liquid content of the litter and adheres to the solid litter. Once the birds are removed from the poultry house, the clumped or caked portion of the soiled litter may then be removed from the poultry house and has generally been spread on farm land as a fertilizer, while the rest of the soiled litter may be left in the poultry house to be available for the next flock.

A problem associated with the processing of soiled litter arises when the litter is mixed with water, as a result of cleaning out of the poultry house, and/or from use of the soiled litter as a fertilizer. Specifically, the water exposed to the litter may become contaminated and become a threat to streams, lakes, or underground water supplies, and may ultimately contaminate the drinking supply. Government agencies in areas of the United States having significant poultry operations have recognized the dangers to the clean water supply. It has become recognized, for example, that soiled litter entering streams and lakes results in growth of organisms that attack and destroy fish in the streams and which may even attack other animals and/or humans, causing severe illness.

Soiled litter, in this type of operation, therefore often represents an expense and pollution liability rather than a marketable fertilizer product. For growers that are unable to simply pile up poultry litter, the only option is to transport the litter to an acceptable location for dumping or other type of disposal. This, of course, incurs additional handling and transportation costs that may affect the commercial viability of the poultry operation.

There is a need, therefore, for an apparatus and related methods that address the problems discussed above.

SUMMARY

In one embodiment, a furnace system is provided for heating a poultry brooder house. The furnace system includes a firebox for burning biomass fuel, and a grate within the firebox for burning the biomass fuel thereon. A distributor assembly is positioned within the firebox and is located directly above the grate. The distributor assembly includes a distributor plate having a plurality of apertures therethrough, and a distributor arm that is spaced above the distributor plate and which is movable relative to the distributor plate to cause biomass fuel supported on the plate to pass through the apertures and fall onto the grate.

The furnace system may include a hopper assembly that defines a well for receiving a volume of biomass fuel for delivery to the distributor plate. The well includes an inlet for receiving biomass fuel from a supply, and an outlet that communicates with an interior of the firebox and which is positioned above the distributor plate assembly. An agitator is disposed within the well and is movable to urge biomass fuel in the well through the outlet and onto the distributor plate.

The agitator may be sized and arranged to conform closely to the dimensions of the well, and the agitator may cooperate with the biomass fuel in the well to limit heat loss from combustion of biomass fuel in the firebox through the hopper assembly. The agitator may have first and second spaced apart agitator arms, wherein the first and second agitator arms are operatively coupled to a shaft at their respective proximal ends and are movable within the well to agitate biomass fuel in the well. At least one elongate member extends between the first arm and the second arm to facilitate agitation of the biomass fuel within the well.

In a specific embodiment, the furnace system has an actuator that is operatively coupled to the agitator, and a controller that communicates with the actuator and which controls operation of the actuator to move the agitator within the well such that biomass fuel within the well is urged through the outlet. At least one sensor is adapted to sense a volume of biomass fuel in the well, with the sensor communicating with the controller and generating a signal related to the sensed volume of biomass fuel in the well. The controller directs the actuator to move the agitator in response to the signal generated by the sensor. The furnace system may, alternatively or additionally, include a storage bin for receiving and storing a volume of biomass fuel for use in the furnace, and a conveyor that is associated with the storage bin and which is configured to deliver biomass fuel from the storage bin to the hopper assembly. A shredder may be located intermediate the storage bin and the hopper assembly for breaking up the biomass fuel into a size suitable for processing through the distributor assembly. The shredder may include a plurality of blades that are spaced from one another by a pre-determined distance, with this distance being substantially the same as a dimension of one or more of the apertures of the distributor plate.

In another specific embodiment, the furnace includes an actuator that is operatively coupled to the distributor arm, and a controller that communicates with the actuator and which controls operation of the actuator to move the distributor arm relative to the distributor plate. At least one sensor is adapted to sense a temperature within the firebox, with the sensor communicating with the controller and generating a signal related to the sensed temperature. The controller directs the actuator to move the distributor arm in response to the signal generated by the sensor. The controller may, for example, direct the actuator to move the distributor arm in an intermittent manner.

In a specific embodiment, the grate includes a first grate plate configured to receive biomass fuel thereon, with the first grate plate having a plurality of first apertures therethrough, and a second grate plate beneath the first grate plate and having a plurality of second apertures therethrough. The first grate plate is movable relative to the second grate plate, and the furnace system includes an actuator that is operatively coupled to the first grate plate and which is configured to move the first grate plate relative to the second grate plate to thereby effect removal of ash from the grate through the first and second apertures. At least some of the first or second apertures through the respective first and second grate plates may include slots having a transverse width of about 0.5 inch.

In a specific embodiment, the firebox of the furnace system includes a first chamber containing the grate and the distribution assembly for primary combustion of the biomass fuel, and a second chamber. The second chamber is in communication with the first chamber and receives gaseous products from the primary combustion of the biomass fuel for secondary combustion of the gaseous products combined with air. The furnace system may include a conduit communicating with the firebox and directing air into the firebox for mixing with the gaseous products to facilitate the secondary combustion. Additionally or alternatively, the furnace system may include a heat exchanger proximate an exit of the second chamber and which is in fluid communication with the poultry brooder house, with the heat exchanger being configured to heat air with heat produced by the second combustion for heating of the poultry brooder house. The furnace system may, additionally or alternatively, include an igniting apparatus, such as a gas burner or a propane heater, for example, proximate the grate, with the igniting apparatus providing initial ignition of biomass fuel received on the grate.

In yet another embodiment, a method is provided for heating a poultry brooder house. The method includes supporting biomass fuel on a grate within a firebox and burning the biomass fuel on the grate. The method includes sensing a temperature within the firebox. Biomass fuel is then supplied to the grate in response to the sensed temperature. The heat generated from combustion of the biomass fuel is used to heat the poultry brooder house. The method may include feeding biomass fuel into the firebox so as to maintain the height of the biomass fuel on the grate in the range of about 0.5 inch to about 4 inches. In another embodiment, biomass fuel is fed into the firebox to maintain the height of the biomass fuel at about 0.5 inch. Alternatively or additionally, the firebox includes an inlet for feeding the biomass fuel into the firebox, and the method includes maintaining a pre-determined amount of biomass fuel at the inlet so as to substantially block heat loss therethrough. In a specific embodiment, a pre-determined temperature is maintained in the firebox so as to permit self-ignition of the biomass fuel supplied onto the grate.

DETAILED DESCRIPTION

Figure 1:
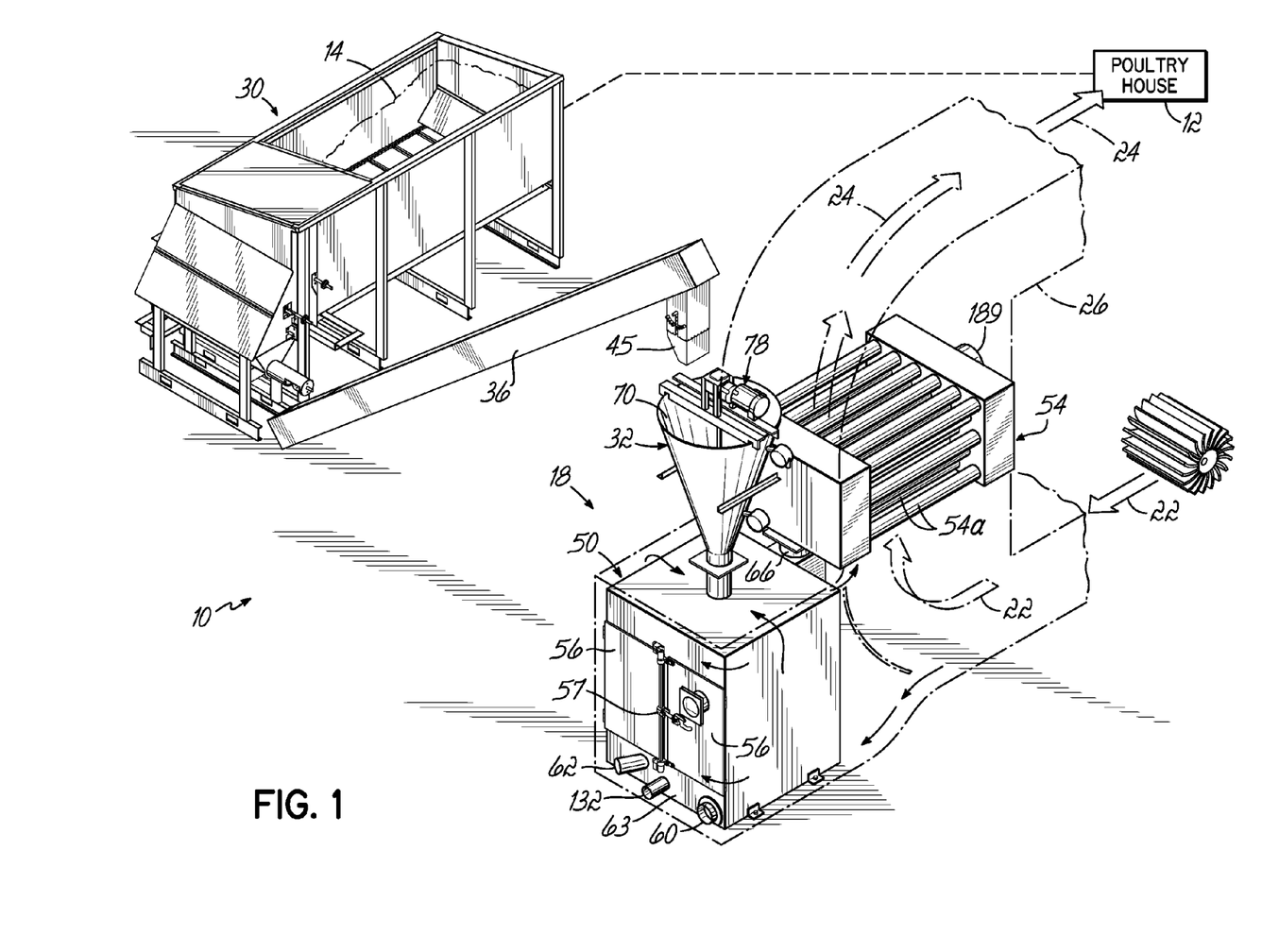
FIG. 1 is a perspective view of a furnace system for heating a poultry brooder house, in accordance with an embodiment of the present invention.
Figure 2:
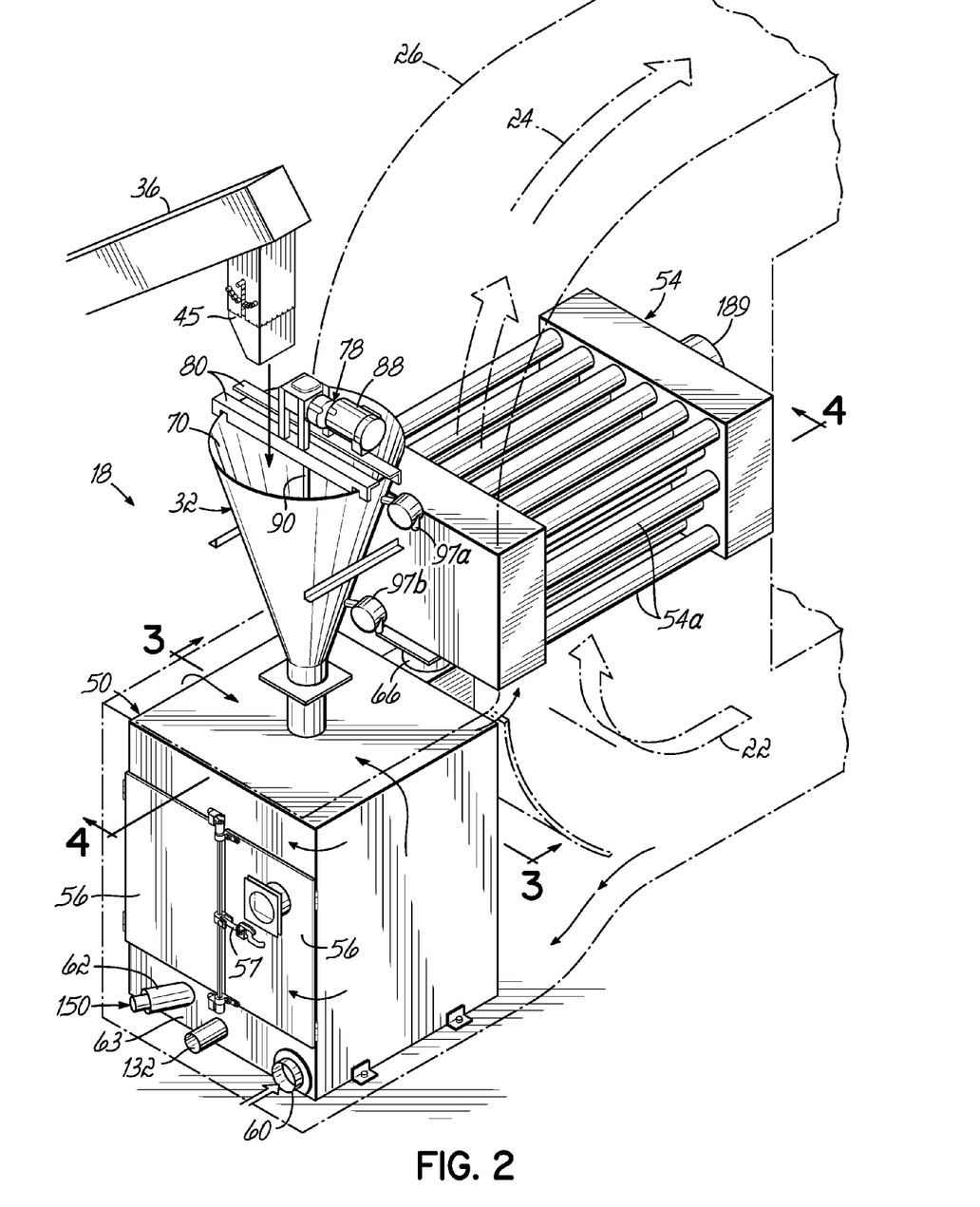
FIG. 2 is an enlarged perspective view of the furnace of the system of FIG. 1.
Figure 2A:
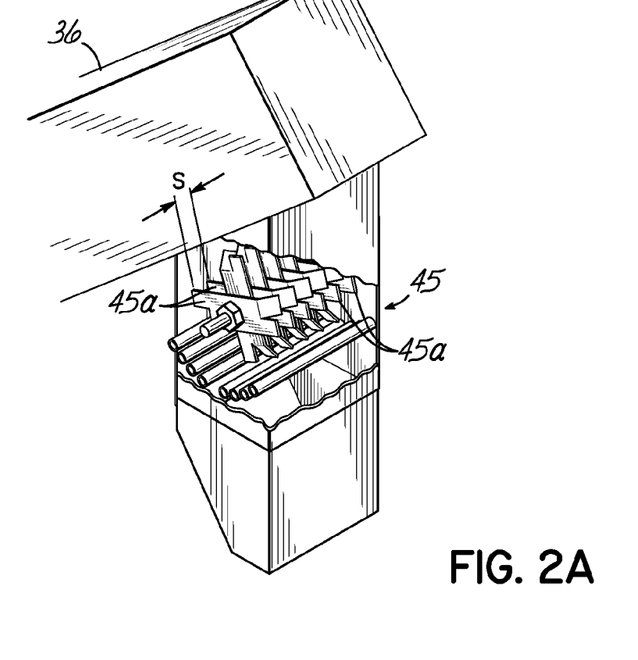
FIG. 2A is an enlarged broken view of a chipper of the system of FIG. 1.

With reference to the figures, and particularly to FIGS. 1-2, a furnace system 10 is provided for heating a poultry house 12, using biomass fuel such as, and without limitation, soiled litter 14 removed from the poultry house 12. System 10 includes a furnace 18 that processes the litter 14 to produce heat which, in turn, heats air (arrows 22, 24) that is directed toward the poultry house 12 through ducts 26. A storage bin 30 of the system 10 receives the litter 14 from the poultry house 12, for example, through conveyors (not shown), manual processes, or any other suitable method. The storage bin 30, which may, for example, be a silage loader, delivers litter 14 to the furnace 18 without any additional processing such as dewatering, for example. The storage bin 30 receives and accumulates the litter 14, and supplies the litter 14 to an inlet of the furnace 18 in the form of a hopper assembly 32. In this exemplary embodiment, the litter 14 is fed from the storage bin 30 to the hopper assembly 32 through a conveyor 36. The system 10 may additionally or alternatively include a shredder or chipper 45 located intermediate the storage bin 30 and the hopper assembly 32 and which breaks up the litter 14 into a size that is suitable for processing through components of the furnace 18 described in further detail below.

In the embodiment shown, furnace system 10 includes a firebox 50 located below the hopper assembly 32, from which it receives litter 14, and an air-to-air heat exchanger 54 that is used to heat the air (arrows 22) flowing through the heat exchanger 54 and toward the poultry house 12. Firebox 50 includes a housing defined by one or more sidewalls 103 and a top wall 104. Doors 56, secured in a closed position by a latch 57, provide access to an interior 58 of the firebox 50 to facilitate, for example, cleaning and/or maintaining the components in the interior of firebox 50. As discussed in further detail below, a first air inlet 60 (FIG. 2) disposed at the base 63, and a second air inlet 61 (FIGS. 3, 3A) though a sidewall 103 of the firebox 50 provide combustion air, through respective blowers into the interior of the firebox 50 (only blower 61a associated with second air inlet 61 is shown). In particular, air entering firebox 50 through air inlets 60, 61 facilitates primary and secondary combustion processes, within firebox 50, for producing heat, as discussed more fully below. The heat exchanger 54 of furnace system 10 is in fluid communication with an exit 68 of the firebox 50 through a duct 66 (FIG. 4) and receives heat generated within the firebox 50 for heating incoming air (arrows 22) that is then directed (arrows 24) to the poultry house 12, as explained in further detail below. Ducts 26 also direct a portion of the incoming air generally around the firebox 50 to facilitate cooling the firebox 50. After being heated by the exterior surfaces of the firebox 50, this portion of the air is rejoined with the air passing through the heat exchanger 54 and is directed to the poultry house 12.

Figure 3:
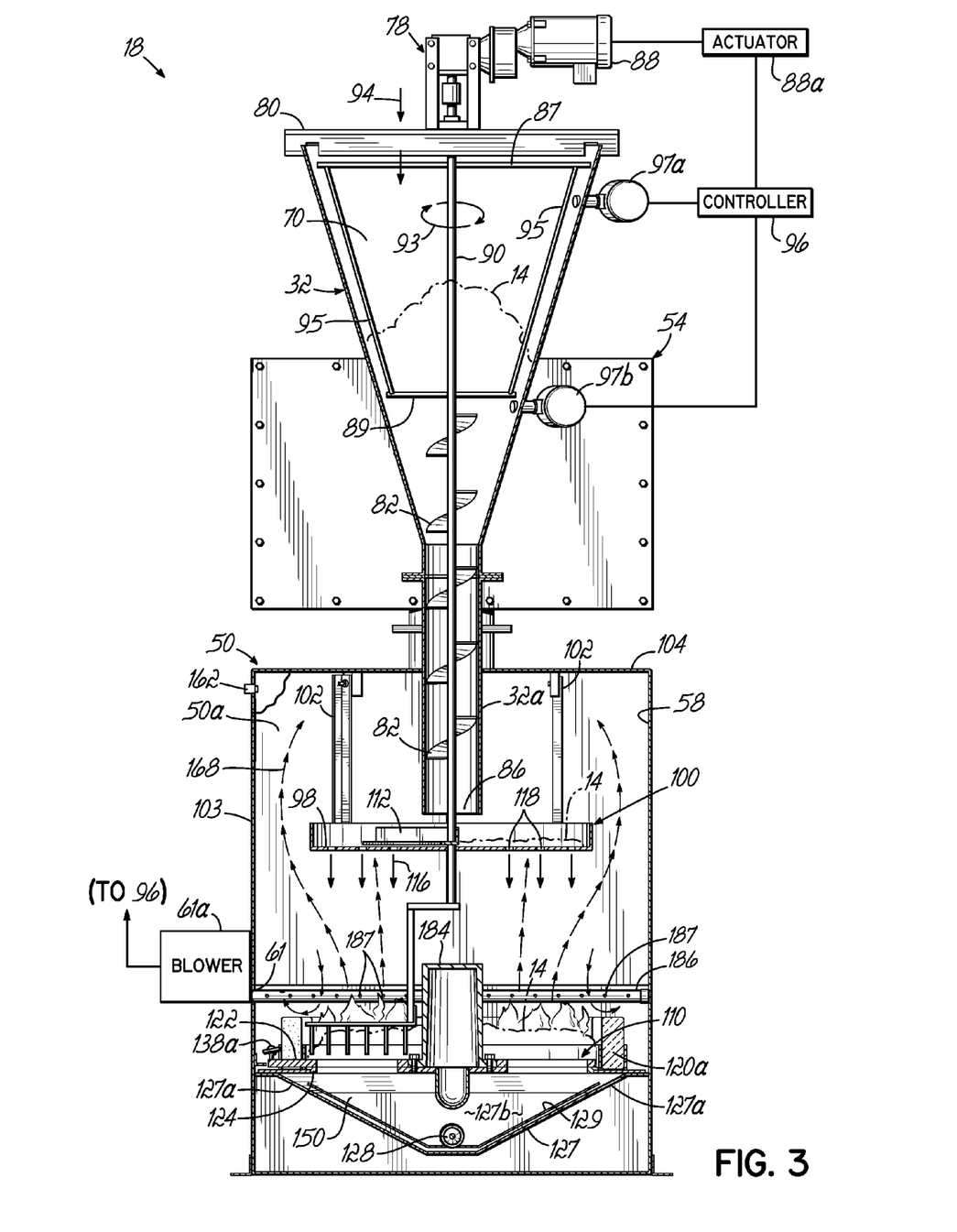
FIG. 3 is a cross-sectional view taken generally along line 3-3 of FIG. 2.
Figure 3A:
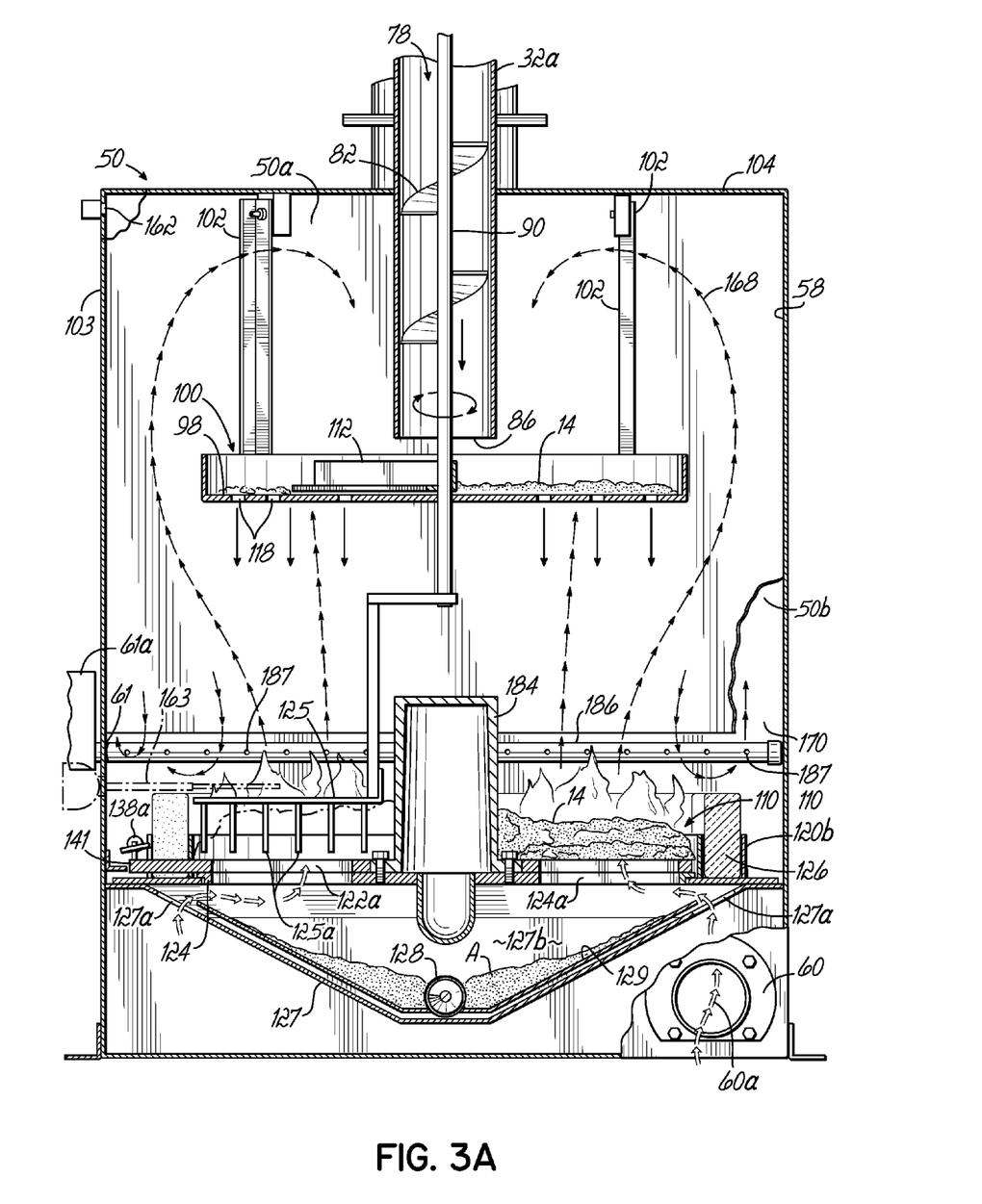
FIG. 3A is an enlarged cross-sectional view of a firebox of the furnace of FIG. 3.

With reference to FIGS. 3 and 3A, the interior portions of hopper assembly 32 and firebox 50 are now described in further detail. The interior of hopper assembly 32 defines a well 70 that receives litter 14 and feeds it into the interior 58 of firebox 50. An agitator 78 is mounted at the upper end of hopper assembly 32, onto a frame 80, and includes helical flightings 82 that facilitate feeding the litter 14 through an outlet 86 at the bottom end of hopper assembly 32. In the embodiment shown, an actuator in the form of a motor 88 is supported by frame 80, and drives a shaft 90 that in turn supports the helical flightings 82. Rotation of the shaft 90 (arrows 93) by action of motor 88 rotates the helical flightings 82 to thereby feed the litter 14 toward the bottom i.e., toward outlet 86 (arrows 94). The agitator 78 may further include one or more upper arms 87 proximate the upper end of well 70, and one or more lower arms 89 proximate the start of the helical flightings 82. In the embodiment shown, pairs of upper arms 87 and lower arms 89 are disposed on opposite sides of the shaft 90, however, it will be appreciated that various other arrangements are possible. Elongate members 95, such as cables or rods, extend between the distal ends of associated upper and lower arms 87, 89 and generally proximate the sidewalls of well 70 to facilitate agitation of the litter 14 and to prevent clumping of litter 14 within the well 70.

Actuation of motor 88 to turn shaft 90 is selectively controlled by a controller 96, such as a PLC, for example. In the embodiment shown, the hopper assembly 32 includes a sensor 97a positioned within well 70 at a location to sense a volume of litter 14 within the well. Signals from sensor 97a related to the volume of litter 14 in well 70 are communicated to controller 96 for use in controlling the operation of motor 88 to feed litter 14 toward outlet 86, and for controlling the operation of storage bin 30 and conveyor 36 to replenish litter 14 when the volume within well 70 is low. In one embodiment, controller 96 may keep track of the number of revolutions of shaft 90 and control operation of storage bin 30 and conveyor 36 to replenish well 70 after a predetermined number of revolutions. Operation of storage bin 30 and conveyor 36 may continue until a signal from sensor 97a is received at the controller 96, indicating that a desired volume of litter 14 within well 70 has been attained. In another embodiment, hopper assembly 32 may further include a second sensor 97b positioned within well 70 to sense the presence of litter 14 and to generate a signal related to a low volume of litter 14 within well 70. Signals generated by second sensor 97b may be communicated to controller 96 to facilitate operation of motor 88 and/or storage bin 30 and conveyor 36 to maintain a desired volume of litter 14 within well 70.

The hopper assembly 32 in this embodiment is thus configured to maintain a pre-selected volume of litter 14 in well 70, for example, to facilitate feeding of litter 14 through outlet 86 into the firebox 50. Alternatively or additionally, the hopper assembly 32 may be configured to maintain a pre-selected volume of litter 14 in well 70 so as to limit the loss of heat and/or gases from firebox 50 through hopper assembly 32. More specifically, in this embodiment, the configuration of the helical flighting 82 and upper and lower arms 87, 89 relative to the interior walls of well 70 and a bottom section 32a of the hopper assembly 32 may be selected such that the litter 14 in well 70 and/or section 32a is effective to plug section 32a to thereby limit the escape of gases and/or heat from the interior of firebox 50.

With continued reference to FIGS. 3 and 3A, litter 14 fed through outlet 86 of hopper assembly 32 may be deposited onto a distributor plate 98 of an optional distributor assembly 100 located inside a first chamber 50a of firebox 50. Distributor plate 98 is supported, in this exemplary embodiment, by support frame members 102 secured to the top wall 104 of firebox 50, although this is intended to be exemplary rather than limiting. The distributor assembly 100 is configured to temporarily hold the litter 14 and controllably feed the litter 14 onto a grate 110 located within the first chamber 50a and generally below the distributor plate 98. To this end, the distributor assembly 100 includes a distributor arm 112 mounted, in this embodiment, to shaft 90, and rotatable relative to the distributor plate 98 by action of motor 88. Distributor arm 112 may be operable to rotate in one or both directions of rotation (i.e., clockwise and counter-clockwise), with rotation of the arm 112 being continuous or intermittent. In this regard, intermittent rotation of arm 112 may, in one embodiment, be such that distributor arm 112 periodically rotates less than a full revolution, stopping between rotations for a predetermined length of time, such as about 15 seconds, for example. In one embodiment, movement of distributor arm 112 is controlled by controller 96 to provide litter 14 to grate 110 at a desired rate.

Distributor arm 112 is spaced close to distributor plate 98 such that rotation of distributor arm 112 evenly distributes litter 14 across the distributor plate 98 and the grate 110 below. As noted above, the distributor arm 112, in this embodiment, is mounted to shaft 90, such that rotation of shaft 90 results in rotation of the distributor arm 112 and rotation of the agitator arms 82 of hopper assembly 32. Those of ordinary skill in the art will readily appreciate, however, that distributor arm 112 may alternatively be rotatable independently from the agitator arms 82, and may be controlled, for example, by a driving mechanism separate from motor 88 and shaft 90.

With continued reference to FIGS. 3 and 3A, and with further reference to FIGS. 2A, 4, 4A, 5, and 7, rotation of distributor arm 112 causes litter 14 supported on the plate 98 to pass through (arrows 116) a plurality of apertures 118 of the plate 98. In this embodiment, and with particular reference to FIGS. 5 and 7, one or more of the apertures 118 may have a dimension (e.g., transverse width "d") that is substantially the same as a spacing "s" between blades 45a of shredder 45 (FIG. 4A), such that the litter 14 processed through the shredder 45 is of a size suitable to pass through the apertures 118.

Litter 14 passing through the apertures 118 of plate 98 falls onto grate 110 for burning thereon. As discussed above, the movement of distributor arm 112 may be intermittent or continuous. The grate 110 of this exemplary embodiment includes first and second generally circular grate plates 122, 124 (FIGS. 3A, 4A, 5, and 6), each having respective sets of first apertures 122a, 124a and second apertures 122b, 124b, at least some of which may be in the form of slots having, for example, a transverse width of about 0.5 inch. Each of the first and second apertures 122a, 124a, 122b, 124b of this exemplary embodiment are in the form of slots of at least two different lengths. The first and second apertures 122a, 124a, 122b, 124b facilitate the passage of ash "A" therethrough when aligned in registration with one another.

A pair of upwardly extending, concentric rims 120a, 120b positioned radially outwardly from grate 110 are sized and arranged to receive a plurality of fire bricks 126 arranged in a side-by-side configuration to help retain the litter 14 on grate 110.

An optional leveling arm 125 (FIGS. 3, 3A) may be coupled to the shaft 90, or to some other component, so as to be selectively movable relative to grate 110. Specifically, the leveling arm 125 may be configured to selectively rotate relative to grate 110 so as to maintain a uniform layer of litter 14 across the grate 110. The leveling arm 125 may further include a plurality of fingers 125a extending downwardly toward grate 110 and arranged to rake through the litter 14 and ash "A" on grate 110 as leveling arm 125 is rotated. The raking action of fingers 125a reduces or eliminates the formation of hot spots in the ash that will tend to solidify, thereby maintaining the ash "A" at a size that will pass through grate 110.

In another exemplary embodiment, furnace 18 may be provided without the optional distributor assembly 100 for receiving litter 14 from hopper assembly 32. In such an embodiment, leveling arm 125 may be utilized to maintain a uniform layer of litter 14 across grate 110, as discussed above.

The grate plates 122, 124 are movable relative to one another such that, when the respective sets of apertures 122a, 124a, 122b, 124b are in registration with one another, ash "A" (FIG. 3A) produced by the burning of litter 14 on the grate 110 is allowed to pass through both sets of apertures 122a, 124a, 122b, 124b and toward an ash-removing apparatus, discussed more fully below.

Figure 6:
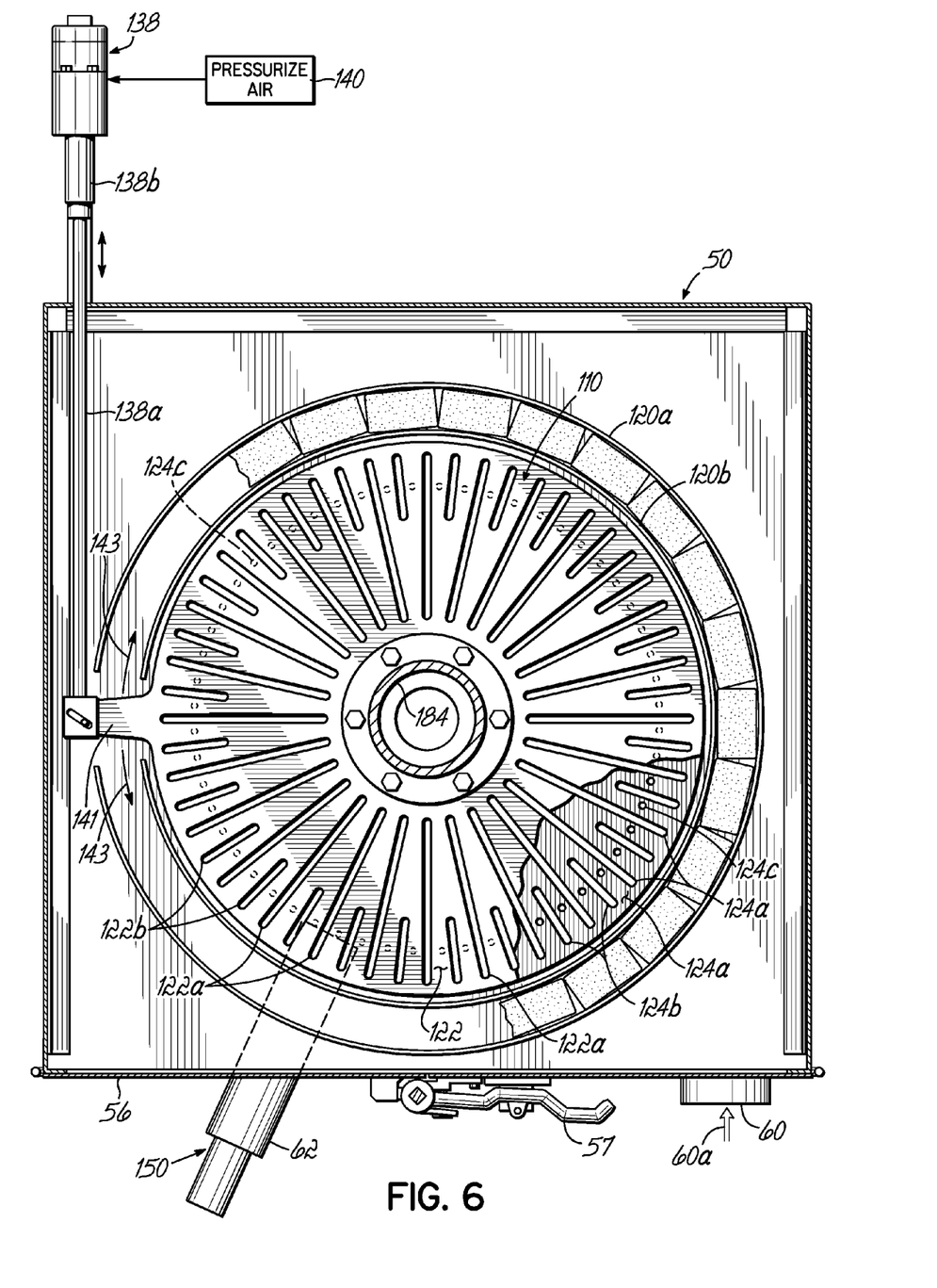
FIG. 6 is a top view of a grate within the firebox of FIG. 3A.
Figure 7:
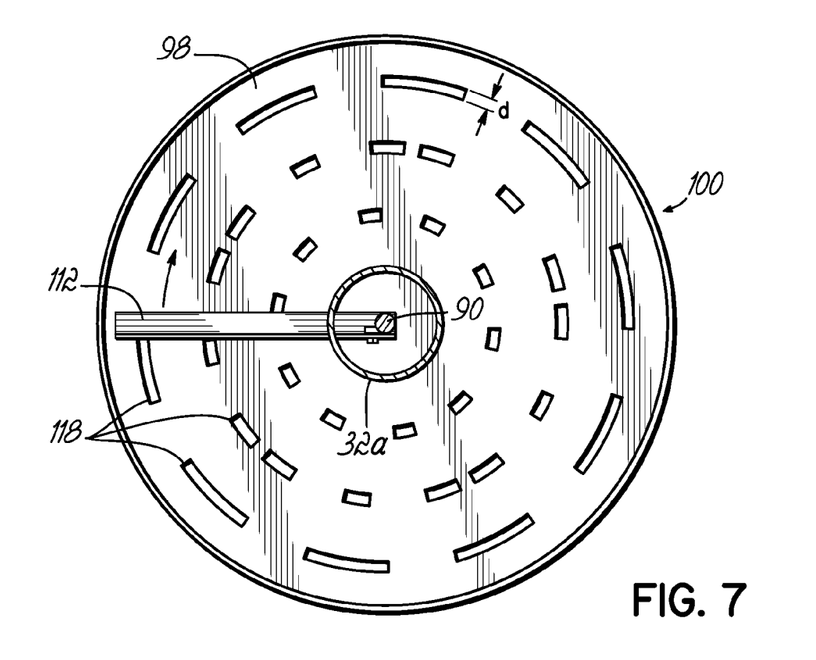
FIG. 7 is a top view of a distributor assembly within the firebox of FIG. 3A.

In the exemplary embodiment of the FIG. 6, relative rotation of the first and second grate plates 122, 124 is facilitated by an actuator in the form of a air cylinder 138 operatively coupled to a source of pressurized air 140. A drive rod 138a of air cylinder 138 is operatively coupled to a protruding arm 141, extending radially outwardly from a main portion of the first grate plate 122, to cause selective rotation thereof (arrows 143 of FIG. 6). When actuated, drive rod 138a extends or retracts relative to a housing 138b, causing rotation of arm 141 and rotation of the entire first grate plate 122. This rotation selectively moves the first grate plate 122 relative to the second grate plate 124, from a first position wherein the first and second apertures 122a, 122b through the first grate plate 122 are not in registration with the first and second apertures 124a, 124b of the second grate plate 124, to a second position wherein the first and second apertures 122a, 122b through the first grate plate 122 are aligned in registration with the first and second apertures 124a, 124b of the second grate plate 124. The first grate plate 122 is maintained in the first position during normal operation of the furnace 18 to burn litter 14 on grate 110. The first grate plate is periodically moved to the second position by the air cylinder 138, under the control of controller 96, to align the apertures 122a, 124a, 122b, 124b of the first and second grate plates 122, 124 so that ash "A" can pass therethrough onto an ash-removing apparatus.

Those of ordinary skill in the art will readily appreciate, however, that movement of the first and second grate plates 122, 124 relative to one another may take various other forms, which may or may not include relative rotation of the grate plates 122, 124. For example, and without limitation, an alternative configuration may include rotation of both grate plates 122, 124, or linear, rather than rotational, movement of one or both grate plates 122, 124.

In exemplary embodiment shown in the figures, the ash-removing apparatus includes a generally V-shaped plate 127 and an auger 128, driven by a motor 130, that removes ash "A" supported on plate 127. Rotation of auger 128 advances the ash "A" through an ash exit outlet 132 (FIGS. 4 and 5) away from the base 63 of firebox 50, for further disposition. To facilitate moving ash "A" toward auger 128, furnace 18 may further include a second, generally V-shaped plate 129 positioned within V-shaped plate 127. The second V-shaped plate 129 is movable relative to V-shaped plate 127 by an actuator 134, such as a pneumatic cylinder or any other suitable device (FIG. 4A). In the embodiment shown, an opening is formed in the second V-shaped plate 129 for receiving the auger 128 therein. Accordingly, as second V-shaped plate 129 is moved by actuator 134, ash "A" is moved in a direction toward auger 128 for removal through exit outlet 132.

The V-shaped plate 127 of this embodiment also facilitates the uniform distribution of combustion air (arrows 60a) received through air inlet 60. Specifically, combustion air (arrows 60a) passes through a plurality of apertures 127a of V-shaped plate 127 into the ash-receiving region 127b above V-shaped plate 127. Air then passes through combustion air apertures 124c in the second grate plate 124, which are aligned in registration with the first and second apertures 122a, 122b of the first grate plate 122 when the first grate plate is in the first position described above.

Figure 4:
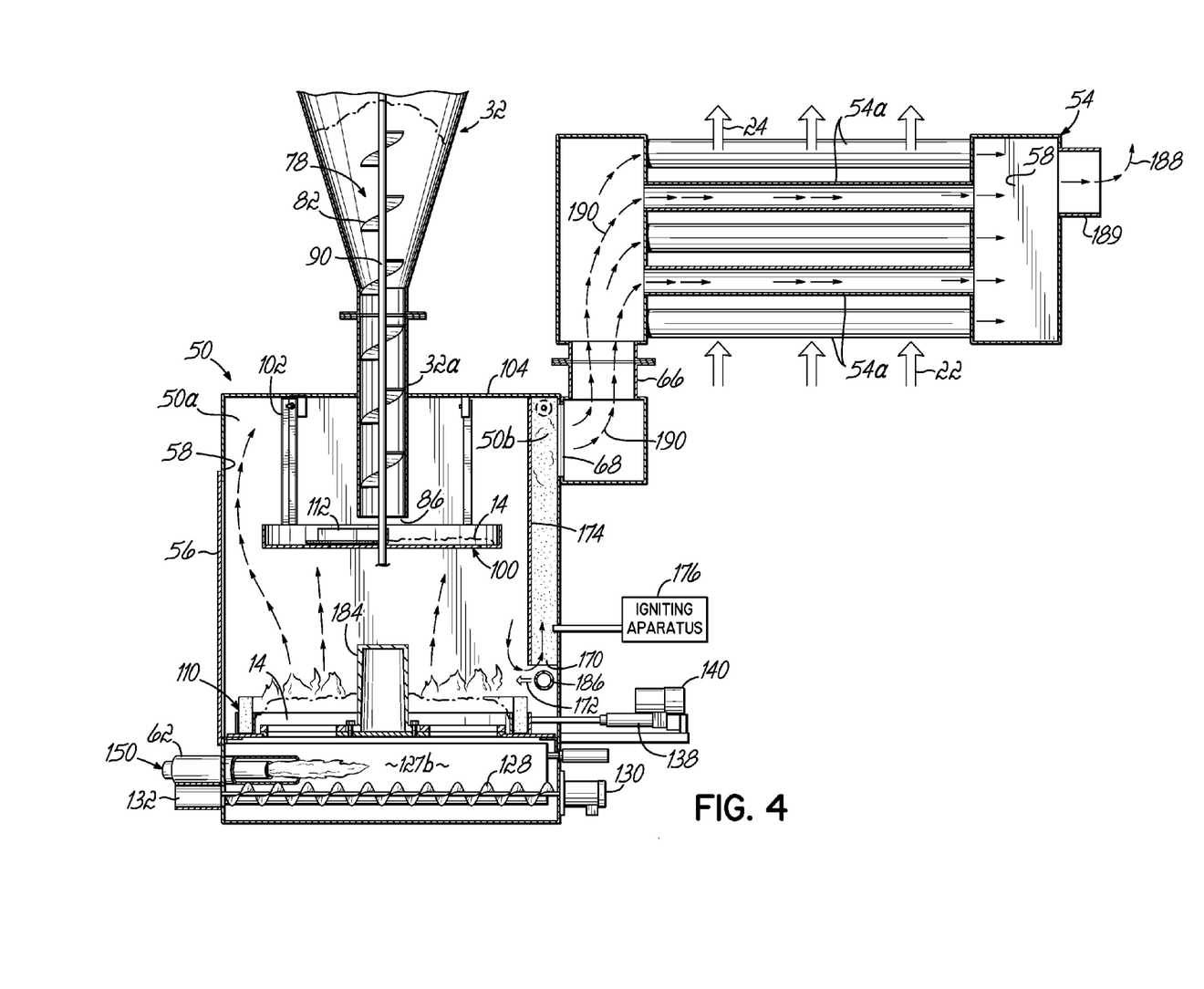
FIG. 4 is a cross-sectional view taken generally along line 4-4 of FIG. 2.
Figure 4A:
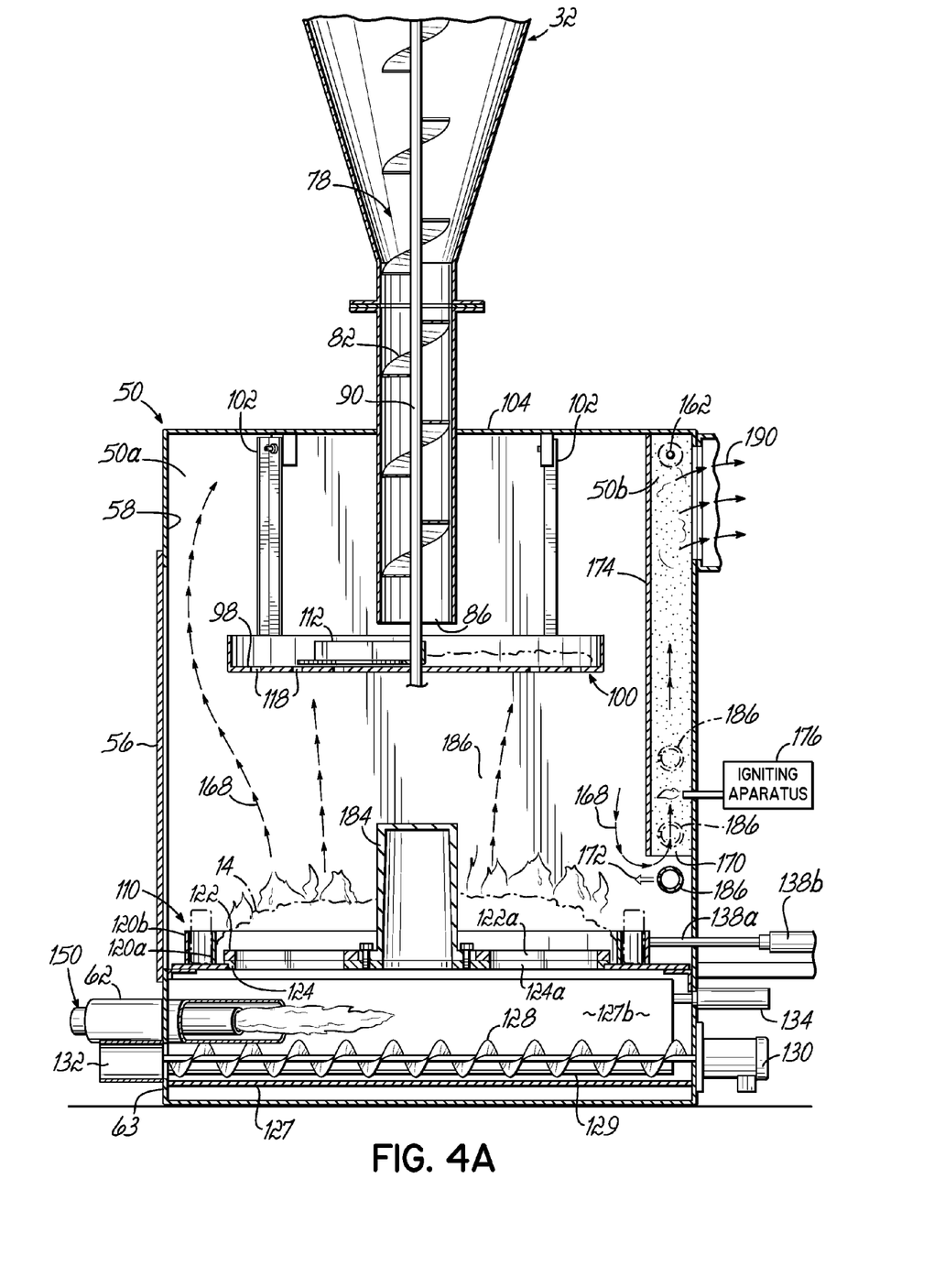
FIG. 4A is an enlarged view of the furnace of FIG. 4.
Figure 5:
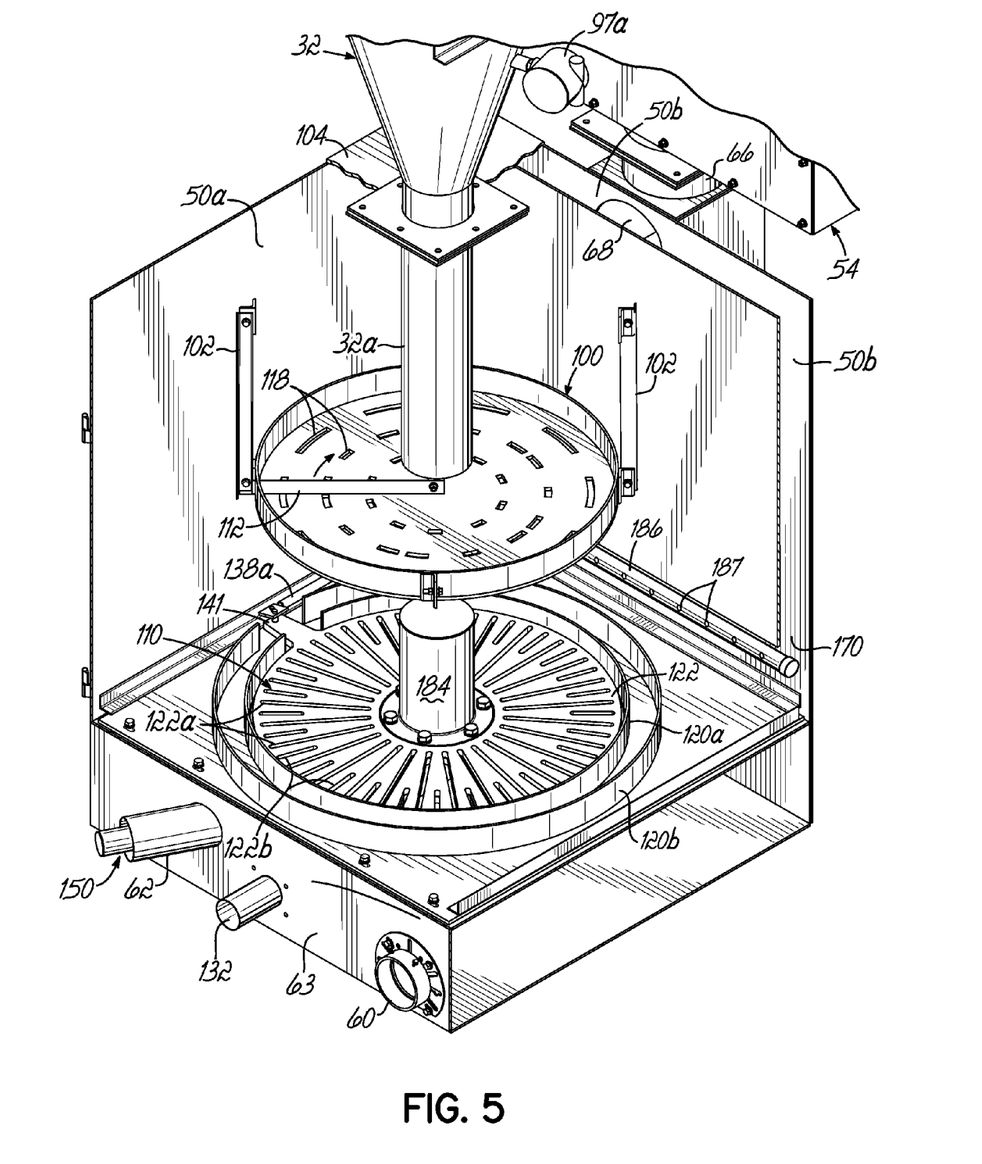
FIG. 5 is a perspective view of an interior portion of the firebox of FIG. 3A.

With particular reference to FIGS. 3A, 4, 4A and 5, burning of the litter 14 on grate 110 is facilitated by combustion air received from outside of the firebox 50 through the first air inlet 60 (FIGS. 2, 3A, 5, and 6). Initial ignition of the litter 14 on grate 110 may be facilitated by an igniting apparatus 150 located beneath grate 110. Igniting apparatus 150 may, for example, be in the form of a gas burner or any other type of burner or heater. In the embodiment shown, igniting apparatus 150 is a power gas burner, Model No. HSG 400 available from Wayne Combustion Systems of Fort Wayne, Ind., received in a conduit 62 extending beneath grate 110 (FIGS. 4, 4A, 6). Igniting apparatus 150 may be controlled by controller 96 to selectively provide ignition of the litter 14 on grate 110 until combustion of the litter 14 is self-sustaining and/or until the temperature within first chamber 50a reaches a predetermined level. For example, in an exemplary embodiment, the igniting apparatus 150 may be kept energized until the temperature within first chamber 50a reaches about 500° F.

In operation, the frequency of actuation of the igniting apparatus 150 is minimized, in this embodiment, by maintaining the height of the litter 14 on grate 110 at a predetermined level. This predetermined level is such that combustion of litter 14 received on grate 110 from the distributor assembly 100 is self-sustaining by virtue of the relatively high temperature within the firebox 50 and by providing a proper amount of combustion air using a variable speed blower, for example. In this regard, for example, it has been found that maintaining the volume of litter 14 on grate 110 to have a height between about 0.5 inch and about 4 inches minimizes the required frequency of actuation of igniting apparatus 150 and eliminates or at least reduces the amount of smoke generated by combustion of litter 14 on grate 110. In another exemplary embodiment, a volume of litter 14 on grate 110 is maintained corresponding to a height between about 0.5 inch to about 2 inches. In yet another exemplary embodiment, a volume of litter 14 on grate 110 is maintained corresponding to a height of about 0.5 inch to about 1 inch. In yet another exemplary embodiment, a volume of litter 14 on grate 110 is maintained corresponding to a height of about 0.5 inch.

In this embodiment, maintenance of a predetermined volume of litter 14 on grate 110, and a predetermined temperature within first chamber 50a, may be accomplished by supplying litter 14 to grate 110 at a rate selected to maintain the desired volume and temperature during combustion of the litter as described above. This operation is facilitated by one or more sensors 162 (one shown in the figures) that sense a temperature within firebox 50. Signals from sensor 162 are communicated to controller 96, which may adjust the operation of agitator 78, supply bin 30, and conveyor 36 to increase or decrease the rate at which litter 14 is provided to grate 110. Controller 96 may also vary the speed of variable speed blowers that provide the primary and secondary combustion air to firebox 50. For example, controller 96 may vary the speed of the blowers based on signals received from sensor 162, the rate at which litter 14 is provided to grate 110, or any other factors or combinations of factors.

Signals from sensor 162 may be utilized by controller 96 to control operation of the igniting apparatus 150, although this is intended to be exemplary rather than limiting. While a single controller 96 has been shown and described herein, it will be appreciated that operation of the furnace system 10, as generally described herein, may be controlled by more than one controller, as may be desired.

In another exemplary embodiment, the height of litter 14 on grate 110 is sensed by an optional sensor 163 (shown in phantom in FIG. 3A) positioned proximate the grate 110. Sensor 163 may be a contact-type sensor, a non-contact-type sensor, or any other type of sensor suitable to sense a height of the litter 14 on grate 110. Signals from sensor 163 may be communicated to controller 96 and used by controller 96 to control the operations of the storage bin 30, conveyor 36, hopper assembly 32, grate 110, combustion air blowers, or various other components of furnace system 10. In such an embodiment, furnace 18 may or may not additionally include sensor 162 for sensing a temperature inside firebox 50.

With continued particular reference to FIGS. 3A, 4, 4A, and 5, burning (i.e., combustion) of litter 14 on grate 110 produces combustion gases (arrows 168) that circulate within first chamber 50a. Combustion gases (arrows 168) leave the first chamber 50a and enter a second chamber 50b of firebox 50 through an opening 170 for secondary combustion. In the embodiment shown, second chamber 50b is at least partially defined by a generally vertical wall 174 located in firebox 50 and extending downwardly from top wall 104 toward base 63 In this embodiment, secondary combustion air is provided through one or more conduits 186 extending horizontally across the interior of firebox 50 and proximate opening 170. A variable speed blower 61a controlled by controller 96 is operatively coupled to conduits 186 to provide the secondary combustion air at a desired rate, and the secondary combustion air exits the conduits via a plurality of spaced apart apertures 187 disposed therealong. As the combustion gases move past conduit 186 and enter opening 170, the secondary combustion air exiting apertures 187 turbulently mixes with the combustion gases and secondary combustion is achieved due to the relatively high temperatures within the firebox 50. If complete combustion is not achieved at the opening 170, additional conduits 186 may be provided within the second chamber 50b to provided additional secondary combustion air for subsequent combustion within second chamber 50b.

In one embodiment, an optional second igniting apparatus 176 may be in communication with the second chamber 50b to facilitate combustion of the mixture of combustion gases and secondary combustion air therein. In the exemplary embodiment of the figures, the high temperature within firebox 50 is sufficient to ignite the mixture of combustion gases (arrows 168) and secondary combustion air (arrows 172), thus obviating the need for second igniting apparatus 176. In this exemplary embodiment, supply of the secondary combustion air, as well as supply of the primary combustion air may be facilitated by one or more blowers, such as variable speed blowers, for example, controlled by a dedicated controller, such as controller 96, as discussed above.

With particular reference to FIG. 4, heat produced by combustion within the second chamber 50b travels (arrows 190) through firebox exit 68 and through a plurality of tubes 54a of the heat exchanger 54. Exhaust gases (arrows 188) from the combustion in second chamber 50b leave furnace 18 through an outlet 189. Air, such as forced air 22, travels in cross-flow fashion past the tubes 54a and is convection-heated by contact with the tubes 54a. The resulting heated air 24 then flows, through ducts 26 (FIG. 2), to poultry house 12 to heat same.

While the above embodiments describe the burning of litter 14 from birds housed within poultry house 12, it is contemplated that the above-described system and methods may additionally or alternatively include the burning of other types of biomass fuels that may or may not be supplied by the birds or other animals housed in a building heated by the combustion of the biomass fuel. In this regard, it is therefore contemplated that the furnace system may burn biomass fuels other than the exemplary bird litter and still fall within the scope of the present disclosure.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in numerous combinations depending on the needs and preferences of the user.

What is claimed is:

1. A furnace system for heating a poultry brooder house, the furnace system comprising:
    a firebox for burning biomass fuel;
    a grate within said firebox for burning the biomass fuel thereon;
    a distributor plate positioned within said firebox and directly above said grate, said distributor plate comprising a plurality of apertures therethrough;
    a hopper assembly defining a well for receiving a volume of biomass fuel for delivery to said distributor plate;
    said well including an inlet for receiving biomass fuel from a supply, and an outlet communicating with an interior of said firebox and positioned above said distributor plate;
    a conveyor configured to deliver biomass fuel from the supply to said hopper assembly; and
    a shredder proximate said hopper assembly for breaking up the biomass fuel into a size suitable for processing through said distributor plate;
    wherein said shredder includes a plurality of blades spaced from one another by a predetermined distance, said distance being substantially the same as a dimension of one or more of said apertures of said distributor plate.

2. A furnace system for heating a poultry brooder house, the furnace system comprising:
    a firebox for burning biomass fuel;
    a grate within said firebox for burning the biomass fuel thereon;
    a distributor assembly positioned within said firebox and directly above said grate, said distributor assembly comprising:
        a distributor plate comprising a plurality of apertures therethrough, and
        a distributor arm above said distributor plate and being movable relative to said distributor plate to cause biomass fuel supported on said plate to pass through said apertures and fall onto said grate;
    a hopper assembly defining a well for receiving a volume of biomass fuel for delivery to said distributor plate;
    said well including an inlet for receiving biomass fuel from a supply, and an outlet communicating with an interior of said firebox and positioned above said distributor plate assembly;

an agitator disposed within said well and being movable to urge biomass fuel in said well through said outlet and onto said distributor plate;

an actuator operatively coupled to said agitator;

a controller communicating with said actuator and controlling operation of said actuator to move said agitator within said well such that biomass fuel within said well is urged through said outlet; and at least one sensor adapted to sense a volume of biomass fuel in said well, said sensor communicating with said controller and generating a signal related to the sensed volume of biomass fuel in said well;

said controller directing said actuator to move said agitator in response to said signal generated by said sensor.

3. The furnace system of claim 2, wherein said agitator is sized and arranged to conform closely to the dimensions of said well, and said agitator cooperates with biomass fuel in said well to limit heat loss from combustion of biomass fuel in said firebox through said hopper assembly.

4. The furnace system of claim 2, wherein said agitator comprises:

first and second spaced apart agitator arms;

said first and second agitator arms operatively coupled to a shaft at their respective proximal ends and being movable within said well to agitate biomass fuel in said well; and at least one elongate member extending between said first arm and said second arm to facilitate agitation of biomass fuel within said well.

5. The furnace system of claim 2, further comprising:

a storage bin for receiving and storing a volume of biomass fuel for use in the furnace;

a conveyor associated with said storage bin and configured to deliver biomass fuel from said storage bin to said hopper assembly; and a shredder intermediate said storage bin and said hopper assembly for breaking up the biomass fuel into a size suitable for processing through said distributor assembly.

6. The furnace system of claim 2, further comprising:

an actuator operatively coupled to said distributor arm;

a controller communicating with said actuator and controlling operation of said actuator to move said distributor arm relative to said distributor plate; and at least one sensor adapted to sense a temperature within said firebox, said sensor communicating with said controller and generating a signal related to the sensed temperature within said firebox;

said controller directing said actuator to move said distributor arm in response to said signal generated by said sensor.

7. The furnace system of claim 6, wherein said controller directs said actuator to move said distributor arm in an intermittent manner.

8. The furnace system of claim 2, wherein:

said grate comprises:

a first grate plate configured to receive biomass fuel thereon, said first grate plate having a plurality of first apertures therethrough, a second grate plate beneath said first grate plate and having a plurality of second apertures therethrough, said first grate plate being movable relative to said second grate plate; and wherein the furnace further comprises an actuator operatively coupled to said first grate plate and configured to move said first grate plate relative to said second grate plate to thereby effect removal of ash from said grate through said first and second apertures.

9. The furnace system of claim 8, wherein at least some of said first and second apertures through said respective first and second grate plates comprise slots having a transverse width of about 0.5 inch.

10. The furnace system of claim 2, wherein said firebox comprises:

a first chamber containing said grate and said distribution assembly for primary combustion of the biomass fuel; and a second chamber in communication with said first chamber and receiving gaseous products from the primary combustion of the biomass fuel for secondary combustion of the gaseous products combined with air.

11. The furnace system of claim 10, further comprising:

a conduit extending within said firebox and directing air into said firebox for mixing with the gaseous products to facilitate the secondary combustion.

12. The furnace system of claim 10, further comprising:

a heat exchanger proximate an exit of said second chamber and in fluid communication with the poultry brooder house, said heat exchanger configured to heat air with heat produced by combustion within said firebox.

13. The furnace system of claim 2, further comprising:

an igniting apparatus proximate said grate, said igniting apparatus providing initial ignition of biomass fuel received on said grate.

14. The furnace system of claim 2, further comprising:

a leveling arm above said grate and being movable relative to said grate to spread biomass fuel supported on said grate into a substantially uniform layer over said grate.

15. The furnace system of claim 14, further comprising:

a plurality of fingers extending from said leveling arm and toward said grate, said fingers spaced and arranged to rake through biomass fuel supported on said grate as said leveling arm is moved relative to said grate.

16. A furnace system for heating a poultry brooder house, the furnace system comprising:

a firebox for burning biomass fuel;

a grate within said firebox for burning the biomass fuel thereon;

a distributor assembly positioned within said firebox and directly above said grate, said distributor assembly comprising:

a distributor plate comprising a plurality of apertures therethrough, and a distributor arm above said distributor plate and being movable relative to said distributor plate to cause biomass fuel supported on said plate to pass through said apertures and fall onto said grate;

a hopper assembly defining a well for receiving a volume of biomass fuel for delivery to said distributor plate;

said well including an inlet for receiving biomass fuel from a supply, and an outlet communicating with an interior of said firebox and positioned above said distributor assembly;

an agitator disposed within said well and being movable to urge biomass fuel in said well through said outlet and onto said distributor plate;

a storage bin for receiving and storing a volume of biomass fuel for use in the furnace;

a conveyor associated with said storage bin and configured to deliver biomass fuel from said storage bin to said hopper assembly; and a shredder intermediate said storage bin and said hopper assembly for breaking up the biomass fuel into a size suitable for processing through said distributor assembly;

wherein said shredder includes a plurality of blades spaced from one another by a predetermined distance, said distance being substantially the same as a dimension of one or more of said apertures of said distributor plate.

17. The furnace system of claim 16, wherein said agitator is sized and arranged to conform closely to the dimensions of said well, and said agitator cooperates with biomass fuel in said well to limit heat loss from combustion of biomass fuel in said firebox through said hopper assembly.

18. The furnace system of claim 16, wherein said agitator comprises:

first and second spaced apart agitator arms;

said first and second agitator arms operatively coupled to a shaft at their respective proximal ends and being movable within said well to agitate biomass fuel in said well; and at least one elongate member extending between said first arm and said second arm to facilitate agitation of biomass fuel within said well.

19. The furnace system of claim 16, further comprising:

an actuator operatively coupled to said distributor arm;

a controller communicating with said actuator and controlling operation of said actuator to move said distributor arm relative to said distributor plate; and at least one sensor adapted to sense a temperature within said firebox, said sensor communicating with said controller and generating a signal related to the sensed temperature within said firebox;

said controller directing said actuator to move said distributor arm in response to said signal generated by said sensor.

20. The furnace system of claim 19, wherein said controller directs said actuator to move said distributor arm in an intermittent manner.

21. The furnace system of claim 16, wherein:

said grate comprises:

a first grate plate configured to receive biomass fuel thereon, said first grate plate having a plurality of first apertures therethrough, a second grate plate beneath said first grate plate and having a plurality of second apertures therethrough, said first grate plate being movable relative to said second grate plate; and wherein the furnace further comprises an actuator operatively coupled to said first grate plate and configured to move said first grate plate relative to said second grate plate to thereby effect removal of ash from said grate through said first and second apertures.

22. The furnace system of claim 16, wherein said firebox comprises:

a first chamber containing said grate and said distribution assembly for primary combustion of the biomass fuel; and a second chamber in communication with said first chamber and receiving gaseous products from the primary combustion of the biomass fuel for secondary combustion of the gaseous products combined with air.

23. The furnace system of claim 22, further comprising:

a conduit extending within said firebox and directing air into said firebox for mixing with the gaseous products to facilitate the secondary combustion.

24. The furnace system of claim 22, further comprising:

a heat exchanger proximate an exit of said second chamber and in fluid communication with the poultry brooder house, said heat exchanger configured to heat air with heat produced by combustion within said firebox.

25. The furnace system of claim 16, further comprising:

an igniting apparatus proximate said grate, said igniting apparatus providing initial ignition of biomass fuel received on said grate.

26. The furnace system of claim 16, further comprising:

a leveling arm above said grate and being movable relative to said grate to spread biomass fuel supported on said grate into a substantially uniform layer over said grate.

* * * * *